(12) United States Patent
Karlsson

(10) Patent No.: US 11,898,639 B2
(45) Date of Patent: Feb. 13, 2024

(54) SEAL WITH DIFFERENT COMPRESSIONS

(71) Applicant: Roxtec AB, Karlskrona (SE)

(72) Inventor: Andreas Karlsson, Karlskrona (SE)

(73) Assignee: Roxtec AB, Karlskrona (SE)

( * ) Notice: Subject to any disclaimer, the term of this patent is extended or adjusted under 35 U.S.C. 154(b) by 0 days.

(21) Appl. No.: 17/776,632

(22) PCT Filed: Nov. 24, 2020

(86) PCT No.: PCT/SE2020/051118
§ 371 (c)(1),
(2) Date: May 13, 2022

(87) PCT Pub. No.: WO2021/107841
PCT Pub. Date: Jun. 3, 2021

(65) Prior Publication Data
US 2022/0403934 A1   Dec. 22, 2022

(30) Foreign Application Priority Data
Nov. 26, 2019   (SE) .................................... 1951350-6

(51) Int. Cl.
*F16J 15/3284*  (2016.01)
(52) U.S. Cl.
CPC ................................. *F16J 15/3284* (2013.01)
(58) Field of Classification Search
CPC ........ F16J 15/3284; F16J 15/06; F16J 15/064; F16J 15/065
See application file for complete search history.

(56) References Cited

U.S. PATENT DOCUMENTS

| | | | | |
|---|---|---|---|---|
| 4,061,344 A | * | 12/1977 | Bradley | .................. E04B 1/947 277/606 |
| 4,622,436 A | * | 11/1986 | Kinnan | ..................... H02G 9/10 277/606 |
| 8,910,949 B2 | * | 12/2014 | Åkesson | ................... F16L 5/04 277/637 |

(Continued)

FOREIGN PATENT DOCUMENTS

| | | |
|---|---|---|
| WO | 2008/069716 A1 | 6/2008 |
| WO | 2008/140399 A1 | 11/2008 |

(Continued)

OTHER PUBLICATIONS

PCT International Search Report for PCT Application No. PCT/SE2020/051118 dated Feb. 18, 2021 (3 pages).

(Continued)

*Primary Examiner* — Gilbert Y Lee
(74) *Attorney, Agent, or Firm* — Merchant & Gould P.C.

(57) ABSTRACT

A seal is formed of two identical seal halves (1). Each seal half (1) comprises a front fitting (4), a rear fitting (5), a compressible part placed between the front fitting (4) and the rear fitting (5) and a number of screws (7, 14, 18, 21). Said screws goes through openings in the front fitting (4), the rear fitting (5) and the compressible part. The compressible part comprises a first material (2), a second material (3) and a middle fitting (6) placed between first material (2) and the second material (3). The first material (2), the second material (3) and the middle fitting (6) have through openings for receiving the screws (7, 14, 18, 21).

10 Claims, 2 Drawing Sheets

(56) References Cited

U.S. PATENT DOCUMENTS

| | | | |
|---|---|---|---|
| D801,286 S * | 10/2017 | Karlsson | D13/156 |
| 2004/0080119 A1* | 4/2004 | Goll | F16L 5/08 |
| | | | 277/607 |
| 2010/0219589 A1 | 9/2010 | Åkesson | |
| 2012/0266409 A1 | 10/2012 | Andersson et al. | |
| 2018/0045338 A1* | 2/2018 | Karlsson | H02G 3/22 |

FOREIGN PATENT DOCUMENTS

| | | |
|---|---|---|
| WO | 2010/089285 A2 | 8/2010 |
| WO | 2010/089286 A2 | 8/2010 |
| WO | 2019/116223 A1 | 6/2019 |

OTHER PUBLICATIONS

PCT Written Opinion for PCT Application No. PCT/SE2020/051118 dated Feb. 18, 2021 (5 pages).
Swedish Search Report for SE Application No. 1951350-6 dated Nov. 26, 2019 (2 pages).

* cited by examiner

SEAL WITH DIFFERENT COMPRESSIONS

This application is a National Stage Application of PCT/SE2020/051118, filed 24 Nov. 2020, which claims benefit of Serial No. 1951350-6, filed 26 Nov. 2019 in Sweden, and which applications are hereby incorporated by reference in their entireties. To the extent appropriate, a claim of priority is made to each of the above disclosed applications.

TECHNICAL FIELD

The present invention concerns a seal with different compressions. Wherein the seal has parts of different material, which different parts are to be compressed with different forces.

BACKGROUND

It is known to use a cylindrical seal for sealing a cable or pipe going through an opening of some kind of partition. Such a cylindrical seal may comprise a compressible part and fittings at opposite ends of the compressible part. In use the seal is placed around the cable or pipe inside the opening of the partition, where after the compressible part is compressed by the fittings being moved towards each other by means of screws. As the compressible part is compressed in axial direction, it expands in radial direction both inwards and outwards, to seal inwards against the cable or pipe and outwards against the opening of the partition.

Seals of this kind are normally placed directly in an opening in the partition or in a sleeve received in the opening of the partition. The partition could be a deck or bulkhead of a ship, a wall of a cabinet, a technical shelter, a junction box or a machine, or a wall, floor or roof of a building.

In seals for cables or pipes going through an opening of some kind of partition, it is sometimes a need for sealing material having different properties. It can for example be a need for sealing against water pressure and fire at the same transition. Other properties may also be wanted, resulting in materials having different properties. However, such materials may have large differences in mechanical properties. For example, a very porous material together with a high density material. Thus, to function optimally the different sealing materials may need and/or withstand different compressing forces.

SUMMARY

In view of the above one object of the present invention is to provide a seal wherein different sealing materials having different properties may be compressed irrespectively of each other. It could also be expressed as a possibility to combine materials with different properties in one single product with controlled compression (for example 30° Shore A in combination with 90° Shore A).

According to one aspect of the invention, a seal is formed of two identical seal halves. Each seal half comprises a front fitting, a rear fitting, a compressible part placed between the front fitting and the rear fitting and a number of screws going through openings in the front fitting, the rear fitting and the compressible part. The compressible part comprises a first material, a second material and a middle fitting placed between first material and the second material. The first material, the second material and the middle fitting have through openings for receiving the screws.

Means may be arranged to be able to compress the first and second materials independently of each other. In one example said means is screws acting on the rear fitting, which screws are surrounded by sockets acting on the middle fitting. In another example said means are screws having threads of different pitches acting on the rear fitting and the middle fitting, respectively.

Further objects and advantages of the present invention will be obvious to a person skilled in the art when reading the detailed description below.

BRIEF DESCRIPTION OF THE DRAWINGS

The invention will be explained further below by way of example and with reference to the enclosed drawings. In the drawings.

DETAILED DESCRIPTION

Figure 1:
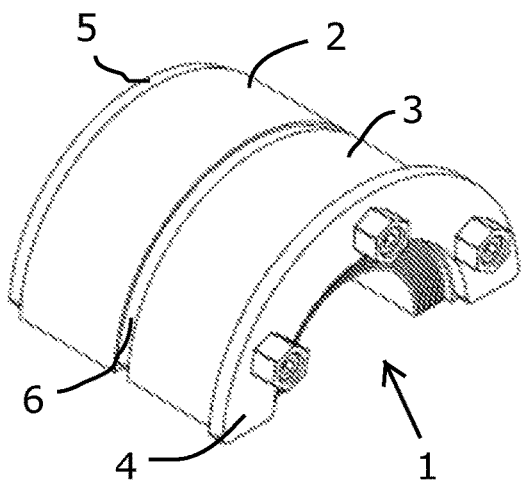
FIG. 1 is perspective view of a seal half of one embodiment of a seal according to the present invention.
Figure 2:
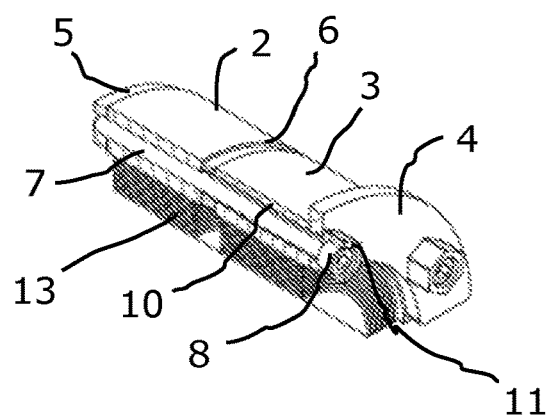
FIG. 2 is a cut perspective view of the seal half of FIG. 1.
Figure 3:
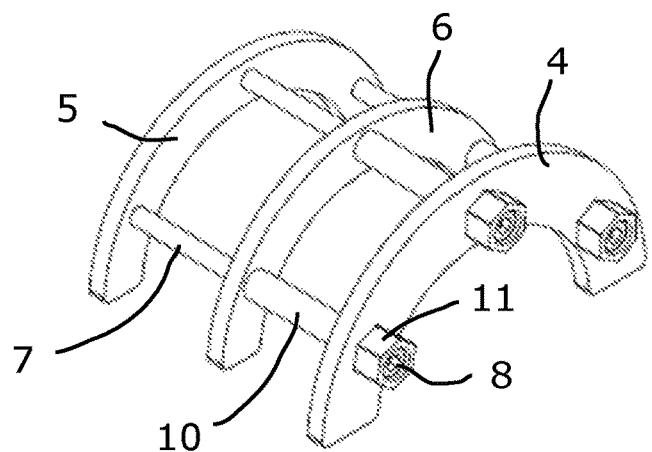
FIG. 3 is a perspective view of parts of the seal half of FIG. 1.
Figure 4:
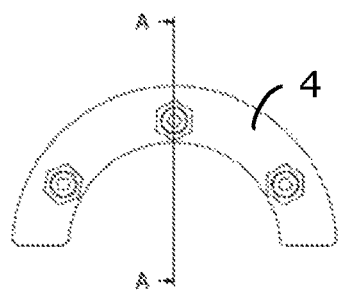
FIG. 4 is an end view of the parts of FIG. 3.
Figure 5:
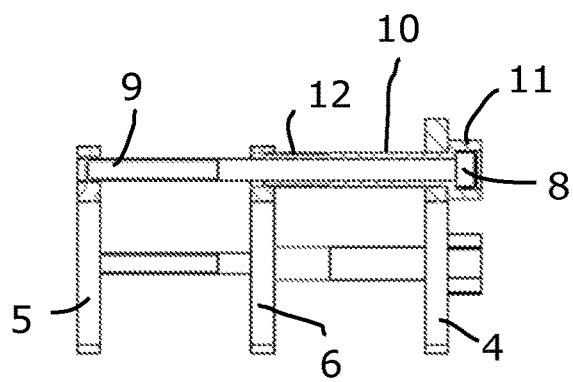
FIG. 5 is a section view taken along the line A-A in FIG. 4.
Figure 6:
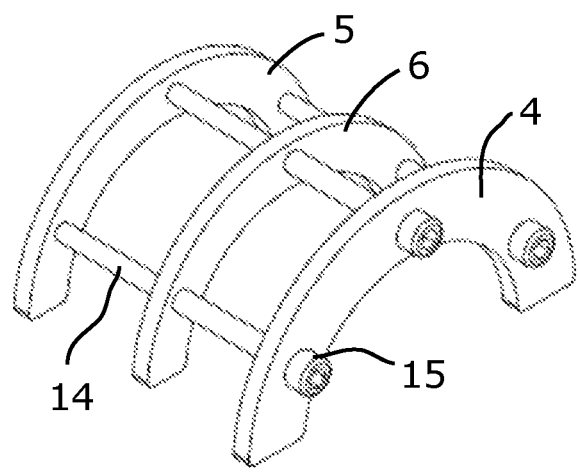
FIG. 6 is a perspective view corresponding with FIG. 3 of a second embodiment of parts of a seal half.
Figure 7:
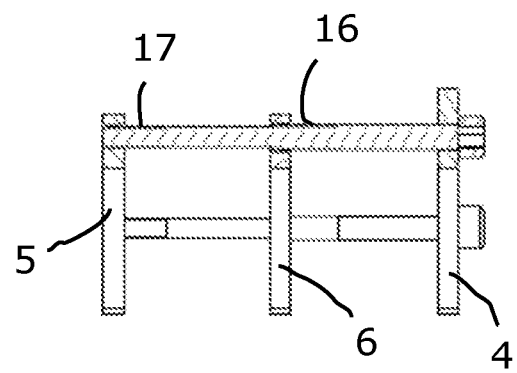
FIG. 7 is a section view corresponding with FIG. 5 of the of the parts of FIG. 6.

Elements that are identical in different embodiments will be given the same reference signs in the description below. As used in this description the expressions "axial", "radial" and similar expressions are in view of a cable or pipe to be received in the seal.

In the shown embodiment a seal half 1 is shown comprising a first material 2 and a second material 3, which first and second materials 2, 3 are made of compressible materials, such as rubber. A front fitting 4 is placed on an outer side of the second material 3 and a rear fitting 5 is placed at an outer side of the first material 2. The front fitting 4 and the rear fitting 5 are placed at opposite ends of the seal half 1. A middle fitting 6 is placed between the first material 2 and the second material 3. The first material 2 and the second material 3 form a compressible part of the seal half 1 together with the middle fitting 6.

A number of screws 7 goes through openings in the front fitting 4, the second material 3, the middle fitting 6 and the first material 2 and ends in threaded openings in the rear fitting 5. Each screw 7 has a screw head 8, in the form of a socket head cap, received at an outer side of the front fitting 4 and a thread 9 for co-operation with one of the threaded openings of the rear fitting 5. A socket 10 is placed outside a stem of each screw 7 between the front fitting 4 and the middle fitting 6. Each socket 10 has a socket head 11, which is hexagonal in the shown embodiment, and which socket head 11 is placed outside and surrounding the screw head 8. Each socket 10 goes through an opening in the front fitting 4 and has a thread 12 at an end which is received in a threaded opening of the middle fitting 6. Each screw 7 and the socket 10 placed outside said screw 7 are free to rotate in relation to each other. Thus, manipulating of one of the screws 7 will not affect the corresponding socket 10 and manipulating of one of the sockets 10 will not affect the corresponding screw 7.

A cylindrical seal is formed in that two seal halves 1 are placed against each other on opposite sides of a cable or pipe. An outer diameter of the front fittings 4 of the formed seal is larger than an inner diameter of an opening of partition, in which opening the cable or pipe with attached seal is to be received, wherein the seal is stopped from going through the opening in the partition. In other embodiments the outer diameter of the front fittings are the same as for the middle fittings and the rear fittings. Such embodiments are used when the seal is to be placed a distance into an opening, a pipe or a sleeve.

By rotating of the screws 7 of the seal half 1, the rear fitting 5 is moved in a direction towards or away from the front fitting 4. The position of the middle fitting 6 is not changed by rotating of the screws 7. By rotating of the sockets 10, the middle fitting 6 is moved in a direction towards or away from the front fitting 4. The position of the rear fitting 5 is not changed by rotating of the sockets 10. The lengths the rear fitting 5 and the middle fitting 6 are to be moved in relation to the front fitting 4 depends on the ability of the first material 2 and the second material 3, respectively, to withstand axial compression and the axial compression needed to give the desired function.

In the shown embodiment there are three screws 7 in each seal half 1. A person skilled in the art realises that other number of screws 7 can be used, for instance depending on the size or other properties of the seal.

In the shown embodiment the seal half 1 has a number of layers 13 on the inside of the first and second materials 2, 3. A number of said layers 13 may be peeled off to adapt an inner diameter of a seal formed of two seal halves 1 to an outer diameter of a cable or pipe to be received inside such a formed seal.

In an alternative embodiment, each screw 7 and corresponding socket 10 is replaced with one single screw 14. Each of the single screws 14 has a screw head 15, which is in the form of a socket head cap in the shown embodiment, and which screw head 15 is received on the outside of the front fitting 4. The screw 14 has a first thread 16 to mesh with one of the threaded openings of the middle fitting 6 and a second thread 17 to mesh with one of the threaded openings of the rear fitting 5. Depending on the pitch of the first thread 16 and the second thread 17, respectively, the rear fitting 5 and the middle fitting 6 may move different distances in relation to the front fitting 4 when the screw 14 is manipulated.

Figure 8:
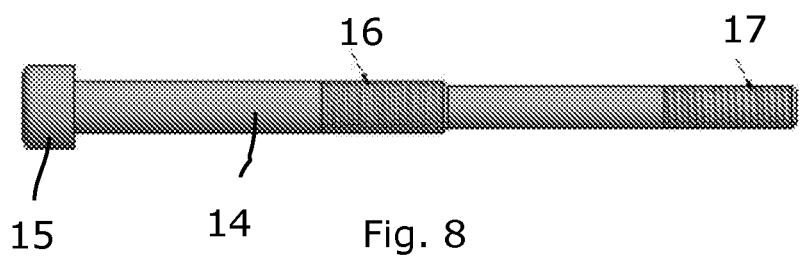
FIGS. 8-10 are examples of screws possible to use in embodiments of the invention.
Figure 9:
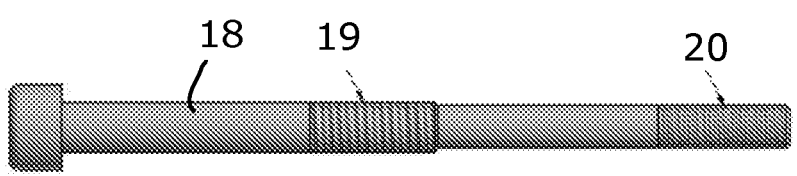
Figure 10:
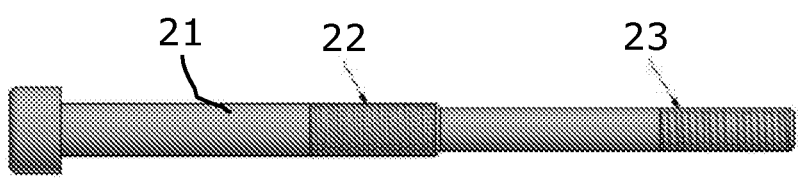

In the FIGS. 8-10 three different screws having different ratios between the first thread and the second thread are shown. In one of the shown examples, the screw 14 of FIG. 8, the first thread 16 has a pitch of 0.5 mm and the second thread 17 has a pitch of 1 mm, which will give a ratio of 1:2 for the movement of the middle fitting 6 in respect of the rear fitting 5, when the screw 14 is manipulated. Thus, in this example the first material 2 will be compressed more than the second material 3 when the screws 12 are tightened.

In FIG. 9 a screw 18 is shown having a first thread 19 with a pitch of 1 mm and a second thread 20 with a pitch of 0.5 mm, giving a ratio of 2:1 for the movement of the middle fitting 6 in respect to the rear fitting 5, when the screw 18 is manipulated. Thus, in this example the first material 2 will be compressed less that the second material 3 when the screws 18 are tightened.

In FIG. 10 a screw 21 is shown having a first thread 22 with a pitch of 0.5 mm and a second thread 23 with a pitch of 0.8 mm, giving a ratio of 1:1.6 for the movement of the middle fitting 6 in respect of the rear fitting 5, when the screw 21 is manipulated. Thus, in this example the first material 2 will be compressed more than the second material 3 when the screws 21 are tightened.

The pitch of the thread of the openings of the middle fitting 6 and the rear fitting 5, respectively, are adapted to the pitches of the first and second threads 16, 17, 19, 20, 22, 23, respectively, of the screws 14, 18, 21 used. A person skilled in the art realises that screws having first and second threads with other pitches than as indicated above may be chosen depending of the properties and axial length of the first material 2 and the second material 3, respectively.

In use two seal halves 1 are placed opposite each other surrounding a cable or pipe going through an opening of a partition. To adapt the inner diameter of the seal to the outer diameter of the cable or pipe one or more layers 13 may be peeled off from each seal half 1. The seal is then pushed into the opening of the partition, with the rear fitting 5 first, until the front fitting 4 abuts the partition, if the outer diameter of the front fitting 4 is larger than the inner diameter of the opening of the partition. For embodiments where the outer diameters are the same for the front fitting, the middle fitting and the rear fitting, the seal may be pushed further into the opening of the partition. The screws and possible sockets are then tightened to compress the first and second materials 2, 3 independently of each other. By the axial compression each of the first and second materials 2, 3 will expand radially to seal against the cable or pipe and the opening of the partition. By said radial expansion the seal will also be held in the opening of the partition.

The invention claimed is:

1. A seal formed of two seal halves, wherein each seal half comprises a front fitting, a rear fitting, a compressible part placed between the front fitting and the rear fitting and a number of screws going through openings in the front fitting, the rear fitting and the compressible part, wherein the compressible part comprises a first material, a second material and a middle fitting placed between the first material and the second material and that the first material, the second material and the middle fitting have through openings for receiving the screws, and wherein the seal further comprises means to move the rear fitting and the middle fitting different axial lengths in relation to the front fitting when manipulating said means and that the first material and the second material have different properties.

2. The seal of claim 1, wherein one of the first and second materials has a mainly fire protecting property, for instance being an intumescent material and wherein one of the first and second material has a mainly sealing property.

3. The seal of claim 1, wherein the means to move the rear fitting and the middle fitting-different axial lengths comprises screws surrounded by sockets.

4. The seal of claim 3, wherein each screw has a thread for cooperation with a thread of one of the openings of the rear fitting, wherein each socket has an outer thread for cooperation with a thread of one of the openings of the middle fitting-and wherein the screw and the socket can be rotated independently of each other.

5. The seal of claim 3, wherein a screw head of the screw is received inside a socket head of the socket.

6. The seal of claim 1, wherein the means to move the rear fitting and the middle fitting-different axial lengths comprises screws having a first thread and a second thread and wherein the first thread and the second thread of each screw have different pitches.

7. The seal of claim 6, wherein the first thread of each screw is to cooperate with a thread of one of the openings of the middle fitting-and the second thread of each screw is to cooperate with a thread of one of the openings of the rear fitting.

8. The seal of claim 6, wherein the first thread of each screw has a lower pitch than the second thread.

9. The seal of claim 6, wherein the first thread of each screw has a higher pitch than the second thread.

10. The seal of claim 1, wherein a number of peelable layers are placed on the inside of the first and second materials.

* * * * *